(12) United States Patent
Quintel

(10) Patent No.: US 8,524,075 B1
(45) Date of Patent: Sep. 3, 2013

(54) BACKWASHING FLUID FILTER ASSEMBLY

(71) Applicant: Mark Anthony Quintel, Kalamazoo, MI (US)

(72) Inventor: Mark Anthony Quintel, Kalamazoo, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 13/660,228

(22) Filed: Oct. 25, 2012

(51) Int. Cl.
*B01D 29/62* (2006.01)
*B01D 29/66* (2006.01)
*B01D 29/68* (2006.01)

(52) U.S. Cl.
USPC ........... 210/108; 210/357; 210/408; 210/411; 210/413; 210/493.1; 210/493.5; 210/791; 210/808

(58) Field of Classification Search
None
See application file for complete search history.

(56) References Cited

U.S. PATENT DOCUMENTS

| | | | | |
|---|---|---|---|---|
| 1,906,391 A * | 5/1933 | McKinley | ...... | 210/411 |
| 2,173,060 A * | 9/1939 | Andrews | ...... | 210/333.1 |
| 3,994,810 A * | 11/1976 | Schaeffer | ...... | 210/103 |
| 4,295,963 A * | 10/1981 | Drori | ...... | 210/108 |
| 4,454,033 A * | 6/1984 | Verduyn | ...... | 210/108 |
| 4,552,655 A * | 11/1985 | Granot | ...... | 210/108 |
| 4,818,402 A * | 4/1989 | Steiner et al. | ...... | 210/411 |
| 4,898,671 A * | 2/1990 | Fux et al. | ...... | 210/333.01 |
| 4,906,357 A * | 3/1990 | Drori | ...... | 210/143 |
| 5,074,999 A * | 12/1991 | Drori | ...... | 210/143 |
| 5,164,079 A * | 11/1992 | Klein | ...... | 210/186 |
| 5,198,111 A * | 3/1993 | Davis | ...... | 210/408 |
| 5,268,095 A * | 12/1993 | Barzuza | ...... | 210/143 |
| 5,364,539 A * | 11/1994 | Castagno et al. | ...... | 210/768 |
| 5,527,462 A * | 6/1996 | Davis et al. | ...... | 210/407 |
| 5,733,464 A * | 3/1998 | Bunch | ...... | 210/791 |
| 5,824,229 A * | 10/1998 | Larkey et al. | ...... | 210/741 |
| 5,855,799 A * | 1/1999 | Herrmann | ...... | 210/780 |
| 6,103,132 A * | 8/2000 | Seyfried et al. | ...... | 210/791 |
| 6,475,397 B1 * | 11/2002 | Sanderson | ...... | 210/791 |
| 7,083,735 B2 * | 8/2006 | Laing | ...... | 210/791 |
| 7,097,046 B2 * | 8/2006 | Calabrese | ...... | 210/391 |
| 8,101,090 B2 * | 1/2012 | Ralvert | ...... | 210/797 |
| 8,297,447 B2 * | 10/2012 | Sorenson et al. | ...... | 210/411 |
| 8,444,862 B2 * | 5/2013 | Ralvert | ...... | 210/780 |

* cited by examiner

*Primary Examiner* — Robert James Popovics
(74) *Attorney, Agent, or Firm* — Fay Sharpe LLP

(57) ABSTRACT

A fluid pressure vessel has a filter cartridge with spaced headers positioning cylindrical pleated filter media. The headers form an inlet chamber communicating with the inlet upstream side of the filter media and an isolated outlet chamber communicating with the downstream side of the filter media. A hollow piston with a toothed periphery having a circumferential slot is positioned closely adjacent the upstream side of the filter media. The piston hollow communicates with a drain chamber isolated from the inlet and outlet chambers. Upon opening of the drain chamber to atmospheric pressure, the pressure in the piston hollow and slot causes a lower pressure in a localized area of the media and back flushing of trapped material on the upstream side of the media to the drain chamber. An actuator is connected to selectively progressively move the piston and slot along the entire surface of the media.

8 Claims, 5 Drawing Sheets

BACKWASHING FLUID FILTER ASSEMBLY

BACKGROUND

The present disclosure relates to fluid filtration, particularly filters employed in line for filtering pressurized fluid such as encountered in petro chemical refining, chemical processing, hydraulic fluid systems and filtration of water and aqueous solutions. In such filtration applications, barrier filters comprised of wire mesh, fabric or screens, and combinations thereof, have been employed in a pressure vessel disposed in-line in a fluid system. Typically, the pressure vessel has a removable lid openable for permitting removal and replacement of a filter cartridge.

In service, the filter media or barrier causes filtered particles of contamination to accumulate on the inlet or pressure side of the filter and causes an increase in differential pressure across the filter media which, in turn, creates a reduction in the process flow.

Heretofore, backwashing by reverse flow has been employed as a means of dislodging filtered particles and contaminates from the surface of the filter media and discharging same to a drain. This often requires shutting down process flow and applying reverse flow pressure to effect the backwashing and also may result in a high volume of contaminated process liquid to be disposed of with the trapped material removed from the filter.

In some filtration systems employing a cylindrical configuration for the barrier or filter media, a rotating member has been heretofore employed with a drain port disposed closely adjacent the inlet pressure side of the filter media and rotated thereabout with the port being open to a drain at substantially atmospheric pressure. This has provided a reverse pressure differential between the discharge pressure side of the filter media and the drain port thus providing localized back flushing or backwashing as the ported member is rotated about the cylindrical filter media. This technique is applicable to cylindrical filter media having a generally smooth interior inlet pressure side; however, where the filter media is formed in a cylindrical pleated configuration, the discharge port of the rotating member is ineffective to create a substantial pressure differential in the pleated regions and thus the backwashing is less effective for such filter configurations.

Accordingly, it has been desired to provide a way or means for removing trapped particles and contaminants from a pleated cylindrical fluid filter in service without the need to shut down the system and apply backwashing pressure to the outlet or the need for removing the filter media cartridge from the pressure vessel.

SUMMARY

The present disclosure describes a fluid filtration assembly with a pressure vessel having an inlet and outlet respectively for connection to a fluid pressure supply and discharge line and a drain port for connection to a valve selectively operated for backwashing filtering media disposed in the pressure vessel. A generally cylindrical filter cartridge having round or pleated filter media is disposed in a pressure vessel and defines therein a fluid inlet chamber communicating exclusively with the interior of the filter media and the inlet. The exterior of the filter media is isolated from the inlet chamber in an outlet chamber and communicates exclusively with the outlet. A depending wall portion of the pressure vessel, which may be formed as part of a removable lid, forms a drain chamber isolated from inlet chamber and communicating with a drain.

In the presently described filtering assembly a piston with a periphery configured to conform to the pleated configuration of the filter media is disposed in the interior of the filter cartridge and has a peripheral slot formed thereabout which communicates with a hollow in the piston and a purge tube having one end connected to the piston. The opposite end of the purge tube is slidably received into the drain chamber and has a discharge port provided in the end within the drain chamber. An operating member or rod is connected to the end of the discharge tube in the drain chamber and the operating rod extends exteriorly of the pressure vessel through a sliding seal and is connected to an actuator for effecting movement of the operating member discharge, tube and piston along the length of the filter media in the cartridge. In the disclosed version, the actuator comprises a pair of fluid pressure cylinders connected via a yoke member to the exterior end of the operating rod.

When back flushing is desired, the drain port is opened to the atmosphere creating a pressure in the piston peripheral port significantly less than the outlet pressure on the exterior side of the filter media thereby creating a localized back flow through the filter media in the region of the peripheral port and the piston causing trapped contaminant material in the localized region to enter the hollow of the piston, the discharge tube for flow outwardly through the discharge port into the drain chamber and out through the drain port. The filter assembly of the present disclosure thus enables backwashing of the filter media interiorly around its circumference at a given station of the piston which is progressively moved along the entire length of the filter media for complete backwashing and which may be accomplished in service without interrupting the process flow. The filter assembly of the present disclosure provides effective backwashing with a minimal amount of contaminated flow to the drain during the backwashing operation.

DETAILED DESCRIPTION

Figure 1:
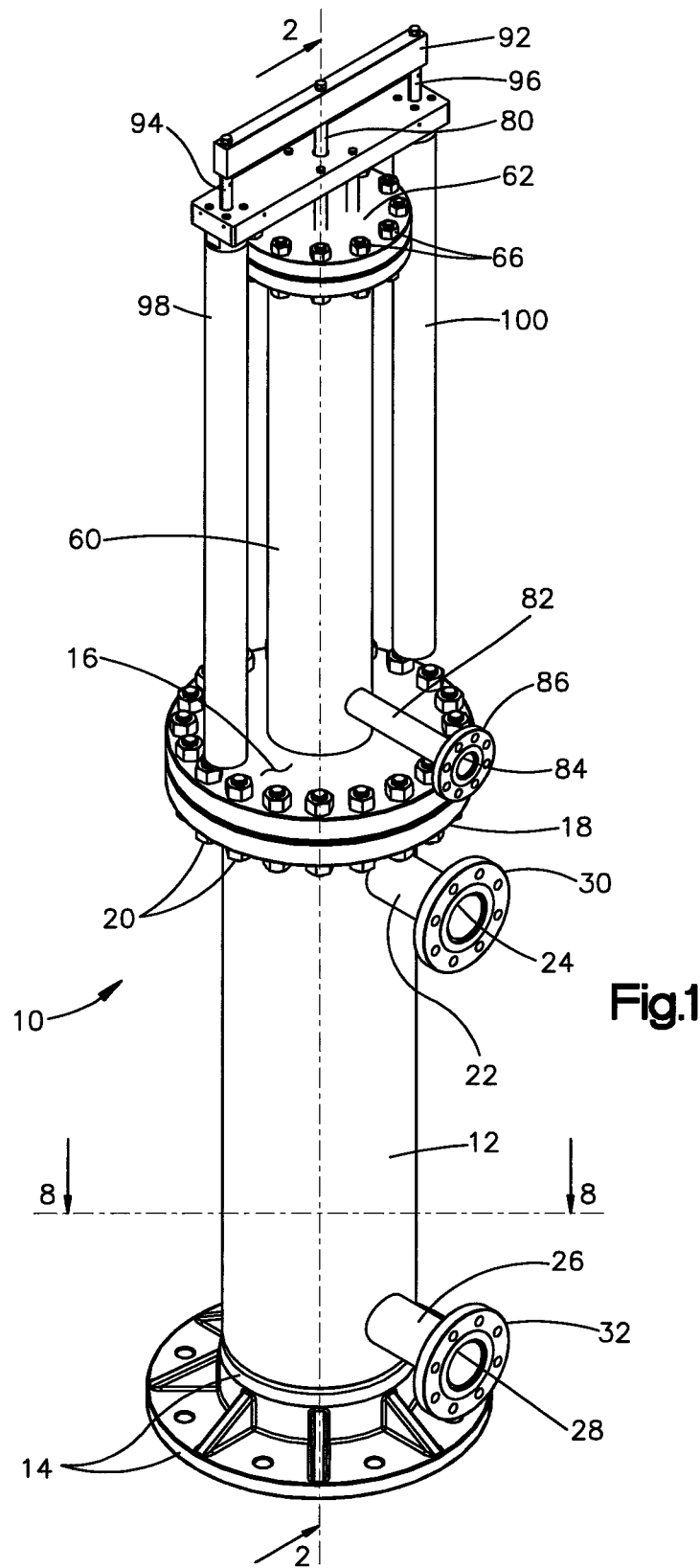
FIG. 1 is a perspective view of one version of a filter assembly according to the present disclosure.
Figure 2:
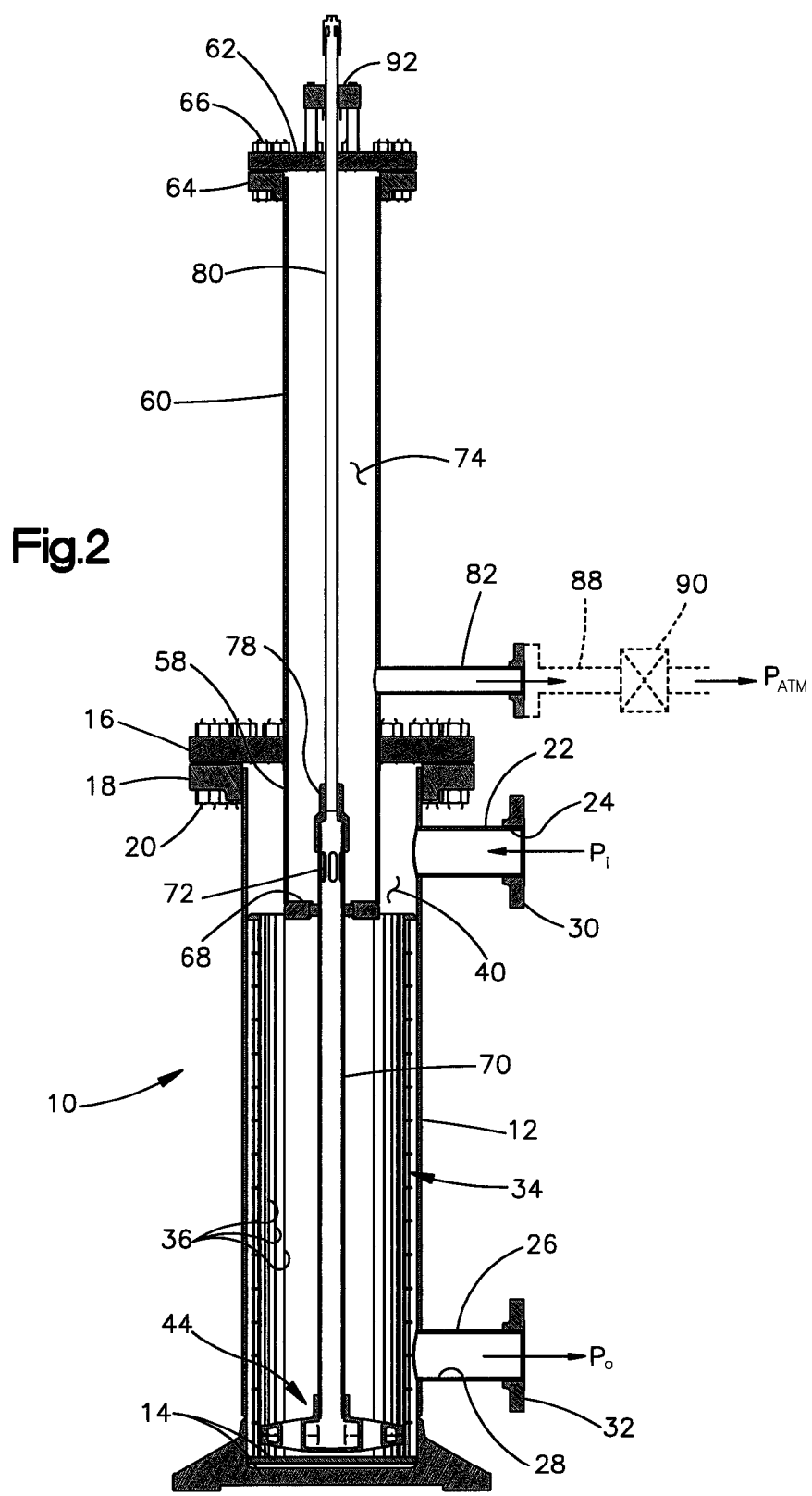
FIG. 2 is a section view taken along section indicating lines 2-2 of FIG. 1.

Referring to FIGS. 1 and 2, filter assembly in accordance with the present disclosure is illustrated in one exemplary version generally at 10 and includes a pressure vessel having a generally cylindrical wall 12 closed at one end by a flanged header 14 and at the opposite end with a lid 16 secured to a flange ring 18 by suitable fasteners such as bolts 20 extending through the flange ring 18 and the lid 16. The vessel wall 12 has an inlet fitting 22 provided thereon with an inlet passage 24 communicating with the interior of the pressure vessel wall 12 in a region adjacent the flange 18. An outlet fitting 26 is provided on the pressure vessel wall 12 adjacent the flanged header 14 and has therein an outlet passage 28 communicating with the interior of the pressure vessel wall 12. The fittings 22, 26 are respectively provided with flanges 30, 32 adapted for bolting connection to respectively a pressurized fluid inlet line (not shown) and a fluid pressure discharge on outlet line (not shown).

Figure 8:
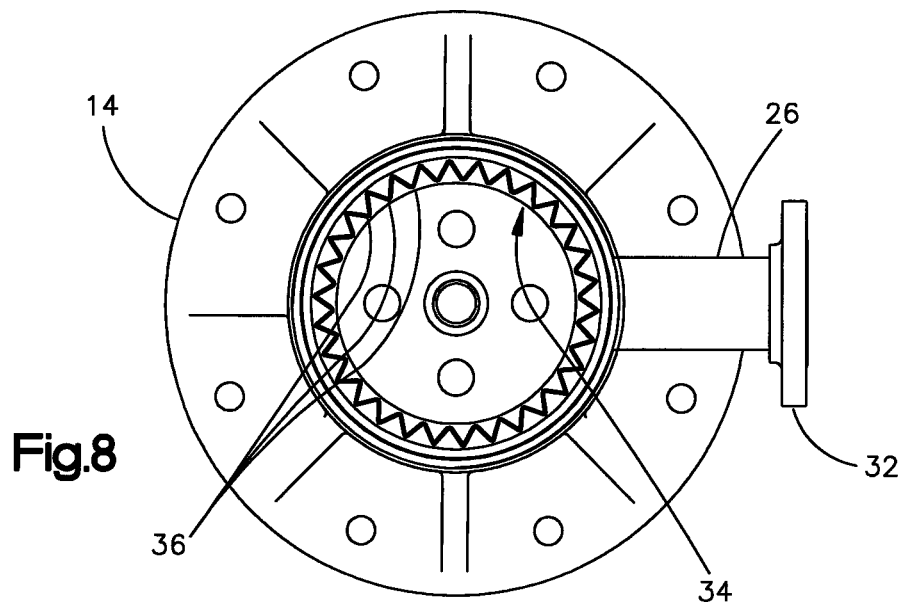
Figure 5:
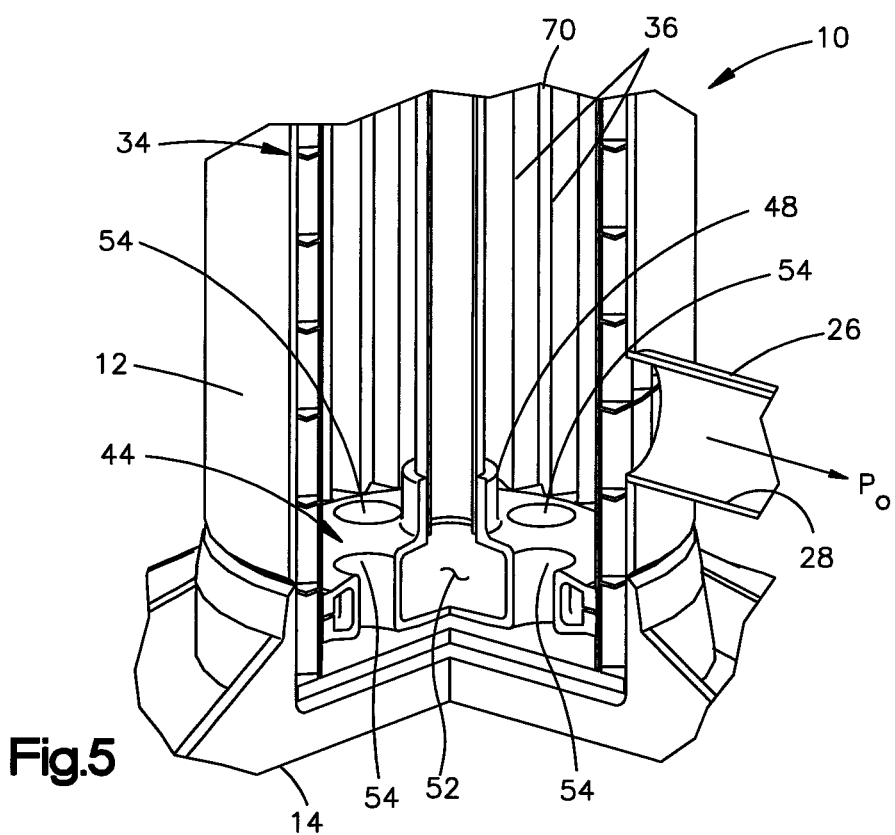
FIG. 5 is an enlarged view of a portion of FIG. 1 with the vessel wall and filter media broken away.

A filter cartridge indicated generally at 34 is received within the pressure vessel and has a generally cylindrical configuration with the filter media formed in a pleated arrangement as denoted by reference numeral 36 in FIGS. 5 and 8.

Figure 3:
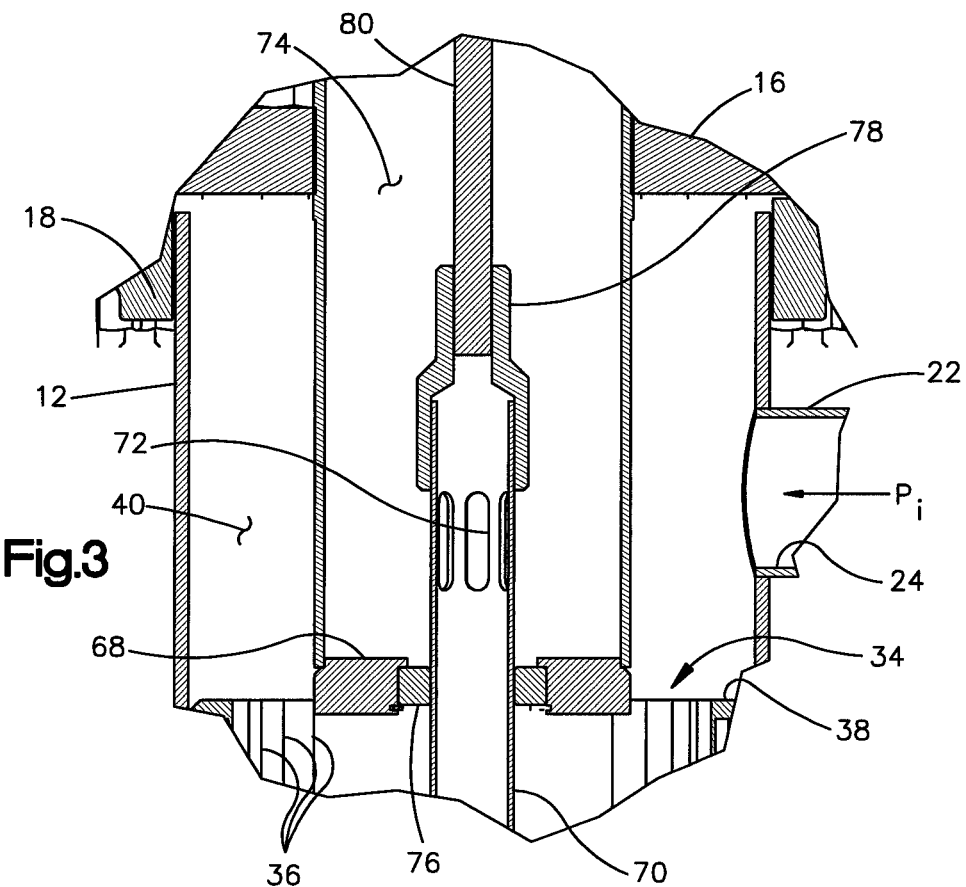
FIG. 3 is an enlarged view of a portion of the section view of FIG. 2 illustrating the discharge port and drain chamber.
Figure 4:
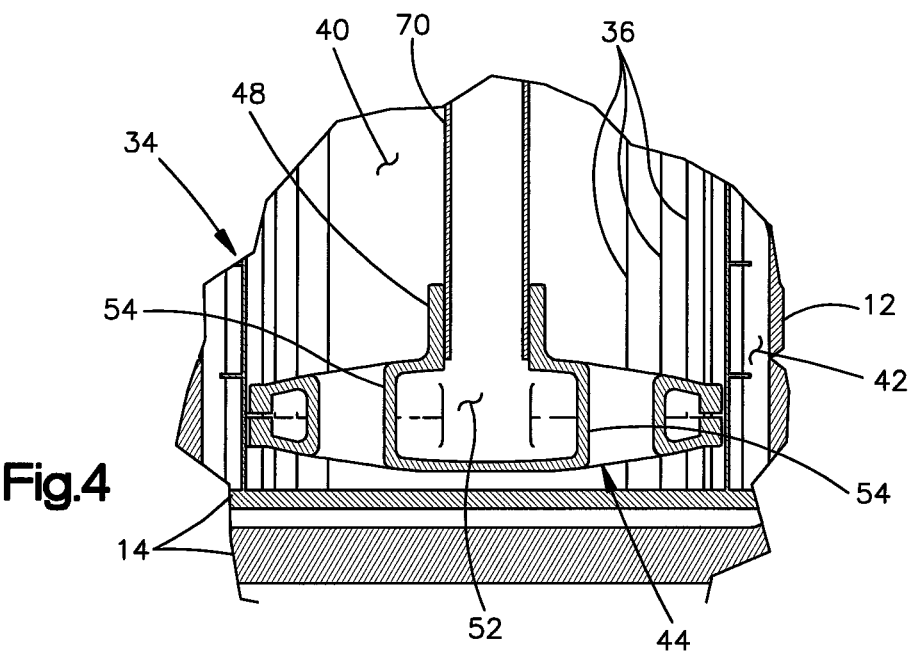
FIG. 4 is an enlarged view of another portion of the cross-section of FIG. 2.

Referring to FIG. 3 and FIG. 4, the filter cartridge 34 has formed thereon at the upper end thereof an annular flange 38, which may be molded onto the pleated filter material 36, and may include dispersed therein graphite particles for effecting ease of assembly into the pressure vessel and sealing against the inner periphery of the wall 12 between the inlet port 24 and the outlet port 28 and spaced adjacent the inlet port 24. The annular flange 38 thus divides the interior of the pressure vessel 12 into an inlet chamber 40 in which the interior of the pleated filter material 36 communicates exclusively with the inlet port 24 and is isolated from the outlet port 28. The annular flange also forms an outlet chamber 42 which is isolated from inlet chamber 40. The exterior of the pleated filter material 36 communicates exclusively with the outlet port 28 and is isolated from the inlet port 24. In service, the inlet chamber is exposed to an inlet pressure $P_i$; and, the outlet chamber 42 is at a discharge pressure $P_o$ which differs from $P_i$ by the amount of the pressure differential due to filtering across the pleated filter material 36.

Referring to FIGS. 4, 5, 6 and 7, a piston indicated generally at 44 is disposed in the interior of the cartridge 34 and has the outer periphery thereof configured in a generally toothed configuration as denoted by reference numeral 46 and piston 44 has a centrally disposed tubular hub 48 formed thereon which has the inner periphery 50 thereof communicating with a hollow chamber 52 formed in the piston 44. The piston also has a plurality of fluid flow apertures 54 formed therethrough for permitting free passage of fluid to opposite sides of the piston.

Figure 6:
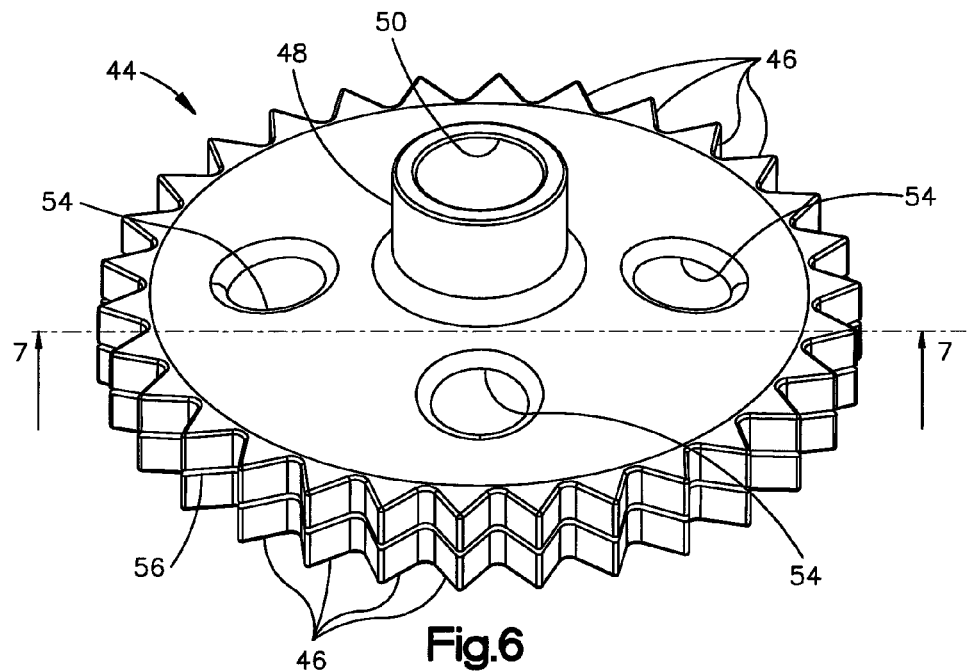
FIG. 6 is a perspective view of the piston of the filter assembly of FIG. 1.
Figure 7:
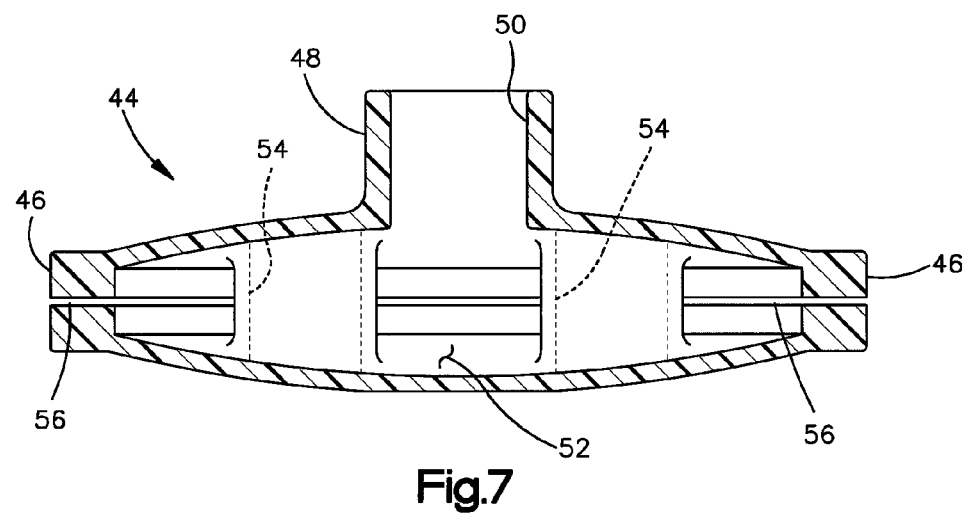
FIG. 7 is a section view taken along section indicating lines 7-7 of FIG. 6; and, FIG. 8 is a section view taken along section indicating lines 8-8 of FIG. 1.

Referring to FIGS. 6 and 7, the piston 44 has formed about its periphery in teeth 46 a peripheral slot 56 which extends through the teeth 46 and communicates the exterior of the teeth with the hollow 52 of the piston. In the present practice, for filtering fluids at elevated temperatures, the piston may be formed of a cast metal such as alloy or stainless steel. For applications filtering only unheated fluids, the piston may alternatively be formed of suitable polymer material. The slot 56 thus ports the hollow 52 of the piston to the pressure $P_i$ in the interior inlet chamber 40 during service. In the present practice it has been found satisfactory to space the piston slot 56 about 2.0 mm from the interior surface of the pleated filter material 36.

Referring to FIGS. 2, 4 and 5, the pressure vessel wall is provided with a depending portion 58 which may comprise a lower end portion 58 of a tubular member 60 which extends upwardly and outwardly through the lid 16. The upper end of the tube 60 is closed by a cover plate 62 secured to an annular flange 64 formed about the upper end of the tube 60 by suitable means such as bolt 66. The lower end 58 of the tube 60 has an annular plug 68 provided therein; and, the plug 68 has received therein the upper end of a purge tube 70 which has its lower end attached to the hub 48 of the piston 44 such that the inner periphery of the tube 70 communicates with the hollow 52 of the piston. The upper end of the purge tube 70 has a discharge port 72 formed therein which communicates the interior of the tube 60. The upper end of tube 70 is slidably received in and sealingly engaged with the inner periphery of the annular plug 68 so as to define a drain chamber 74 within the tube 60. The interior of tube 70 thus is communicated with drain chamber 74 through discharge port 72. In the present practice the purge tube also may be formed of alloy or stainless steel.

Referring to FIG. 3, the annular plug 68 is shown as having an annular sliding seal 76 provided thereon for slidably engaging and sealing against the outer periphery of tube 70.

The lower end of tube 70 is secured onto the hub 48 of piston 44 by any suitable expedient as, for example, adhesives or weldment in such a way that the hollow 52 of the piston and the interior of tube 70 are isolated from the fluid pressure $P_i$ in the inlet chamber 40.

Referring to FIGS. 2 and 3, the upper end of the purge tube 70 is connected by a suitable main such as annular coupling 78 to an operating member or rod 80 which extends upwardly through the cover plate 62 in sliding sealed engagement so as to maintain the integrity of the drain chamber 74 isolated from the atmosphere.

Referring to FIGS. 1 and 2, the drain fitting 82 is provided on the exterior of the tube 60 and has a drain port formed therethrough which communicates through the wall of tube 60 to the drain chamber 74. The outer end of the fitting 82 has a flange 86 provided thereon which is adapted for connection to a drain line such as shown in dashed outline at 88 in FIG. 2. The drain line 88 may be connected to a remotely operated valve indicated in dashed outline at 90 in FIG. 2 which, upon opening connects the drain chamber 74 to substantially atmospheric pressure $P_{ATM}$ for discharge of backwash and filter contaminants. Valve 90 is normally closed.

Referring to FIG. 1, the operating rod 80 has its upper end connected to a yoke 92 which has its opposite ends connected to respectively piston rods 94, 96 which rods extend from respectively fluid power cylinders 98, 100 which if desired, may be mounted on the lid 62 as shown in FIG. 1. Upon the selected introduction of pressure into the fluid power cylinders 98, 100, the piston rods 94, 96 move the yoke 92 upwardly to raise the operating rod 80 and pull the discharge tube 70 and piston 44 upwardly along the inner surface of the pleated filter media 36.

In operation, process flow enters inlet port 24 at the supply pressure $P_i$ in the inlet chamber 40 and flows outwardly through the pleated filter media 36 into the discharge chamber 42 and to the discharge port 28 at the outlet pressure $P_o$. In service debris or solids filtered from the fluid accumulate on the interior surface of the fitter media 36 thus causing changes in the pressure differential between $P_i$ and $P_o$ thereby necessitating a cleaning operation as will be hereinafter described.

When it is desired to backwash the filter material 36 and cartridge 34, the drain valve 90 is opened causing a sudden reduction of pressure to atmospheric in the drain chamber 74 and discharge port 72 and the interior of the discharge tube 70 and piston hollow 52. The sudden reduction of pressure in the piston hollow 52 is applied through the peripheral slot 56 to the teeth 46 of the piston and locally to the inner surface of the pleated material 36 adjacent the slot 56 in each pleat. The sudden drop of pressure in the local area between the inner surface of the pleated media and the face of the teeth of the piston creates a pressure differential between the interior of the pleat in the local area of the slot 56 and the external pressure $P_o$ in the chamber 42 thereby causing back flow in the localized region adjacent the slot 56 and removal of contaminant from the interior surface of the pleated material in the localized region and flow into the hollow 52 of the piston upwardly through discharge tube 70 and through discharge port 72 into chamber 74 and outwardly through the port 84 and drain tube 88. When the drain valve 90 is opened to initiate back flow through the slot 56 in the piston 44, the yoke 92 is raised by actuation of the power cylinders 98, 100 and movement of rods 94, 96 which moves the piston 44 upwardly progressively along the interior surface of the pleated material 36 such that the entire inner periphery of the cartridge 34 is purged of contaminant with minimal affect on the process flow because the balance of the filter cartridge 34 not exposed to the back flow is undisturbed and the filtering can continue in a normal operative manner.

The present disclosure thus describes a filter assembly which, upon activation of the remotely operated drain valve and power actuators, is operative to progressively remove contaminates from the interior of the cylindrical filter cartridge having pleated filter media material along the length of the cartridge without interrupting the normal process flow through the filter assembly.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A fluid filtering assembly comprising:
   (a) a pressure vessel having a wall with a fluid inlet port and a fluid outlet port adapted respectively for connection to a source of pressurized fluid and a fluid discharge line;
   (b) a removable pleated filter media cartridge having an interior upstream side and an exterior downstream side, the cartridge disposed in the pressure vessel and defining therein with the wall thereof (i) a fluid outlet chamber fluidically communicating exclusively with the outlet and the exterior downstream side of the filter media cartridge and (ii) a pressurized fluid inlet chamber fluidically communicating exclusively with the inlet and the interior upstream side of the pleated filter media cartridge;
   (c) a piston having a hollow interior and a peripheral surface disposed adjacent to and shaped to interfittingly extend between pleats of the interior upstream side of the pleated filter media cartridge, the peripheral surface including fluid porting fluidically communicating with the hollow interior;
   (d) the pressure vessel including a depending wall portion extending into the inlet chamber and defining on one side thereof a drain chamber isolated from the inlet chamber, the drain chamber fluidically communicating with an exterior drain port adapted to be connected for selective opening;
   (e) a purge tube having a first end connected to the piston with the interior of the purge tube fluidically communicating with the hollow interior of the piston and a second end opposite the first end slidably extending through the depending wall portion into the drain chamber, the purge tube having a discharge port in the region of the second end fluidically communicating the interior of the purge tube with the drain chamber;
   (f) an operating member having a first end connected to the second end of said purge tube and having a second end slidably extending exteriorly of the wall of the pressure vessel;
   (g) actuator means connected to the second end of the operating member and operative upon selective actuation to move the operating member, purge tube and piston for sliding the piston fluid porting along the interior upstream side of the pleated filter media cartridge; and,
   (h) wherein, upon connection of the inlet port to a source of fluid pressurized to a supply pressure, fluid enters the inlet chamber and flows into the interior upstream side through the pleated filter media cartridge to the exterior downstream side and the outlet chamber and to the outlet port at an outlet pressure; and, upon selective opening of the drain port the pressure in the hollow interior of the piston decreases to a level less than the outlet pressure causing localized backflow through the pleated filter media cartridge and a flow of filtered material through the piston fluid porting to the piston hollow interior, through the interior of the purge tube and through the discharge port to the drain chamber and drain outlet; and, upon selective actuation of the actuator means, the piston is moved along a said interior surface of the upstream side of the pleated filter media cartridge thereby providing localized backflow progressively along the surface of the interior upstream side of the pleated filter media cartridge for removing filtered material trapped thereon.

2. The assembly defined in claim 1, wherein the pressure vessel has a removable lid with the operating member slidably received therethrough.

3. The assembly defined in claim 2, wherein the pressure vessel depending wall portion is included with the lid.

4. The assembly defined in claim 1, wherein the piston fluid porting includes an elongated slot.

5. The assembly of claim 1, wherein the actuator means includes a fluid power cylinder connected to the second end of the operating member.

6. The assembly defined in claim 1, wherein the actuator means includes a yoke connected to the second end of operating member and a pair of fluid power cylinders connected to the yoke.

7. The assembly defined in claim 1, wherein the piston is formed of polymeric material.

8. The assembly defined in claim 1, wherein the piston is formed of one of cast alloy steel and cast stainless steel.

* * * * *